US012585464B2

(12) United States Patent (10) Patent No.: US 12,585,464 B2

Bhowmick et al. (45) Date of Patent: Mar. 24, 2026

(54) APPLICATION MATURITY DATA PROCESSING FOR SOFTWARE DEVELOPMENT

(71) Applicant: ACCENTURE GLOBAL SOLUTIONS LIMITED, Dublin (IE)

(72) Inventors: Partha Pratim Bhowmick, Hounslow (GB); Siddhesh Ramakant Tengse, Dartford (GB); Nilanjan Islam, Uxbridge (GB); Abhishek Dixit, Wembley (GB)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 583 days.

(21) Appl. No.: 18/135,547

(22) Filed: Apr. 17, 2023

(65) Prior Publication Data

US 2024/0345838 A1    Oct. 17, 2024

(51) Int. Cl.
| | |
|---|---|
| *G06F 8/77* | (2018.01) |
| *G06F 16/3329* | (2025.01) |
| *G06F 16/334* | (2025.01) |

(52) U.S. Cl.
CPC ............ *G06F 8/77* (2013.01); *G06F 16/3329* (2019.01); *G06F 16/3344* (2019.01)

(58) Field of Classification Search
CPC ..... G06F 16/3344; G06F 8/77; G06F 16/3329
USPC ........................................................ 717/101
See application file for complete search history.

(56) References Cited

U.S. PATENT DOCUMENTS

| | | | | | |
|---|---|---|---|---|---|
| 5,414,797 | A | * | 5/1995 | Vassiliadis ............ | G06F 16/334 |
| | | | | | 707/999.005 |
| 7,937,281 | B2 | * | 5/2011 | Miller ................... | G06Q 10/06 |
| | | | | | 705/7.12 |
| 8,635,592 | B1 | * | 1/2014 | Bodman .................. | G06F 8/38 |
| | | | | | 717/113 |
| 8,990,763 | B2 | * | 3/2015 | Sakhardande ......... | G06Q 30/00 |
| | | | | | 717/125 |
| 9,158,663 | B2 | * | 10/2015 | Vaidyan .............. | G06F 11/3466 |
| 9,189,757 | B2 | * | 11/2015 | Finlayson .............. | G06Q 10/06 |
| 9,558,098 | B1 | * | 1/2017 | Alshayeb ............ | G06F 11/3604 |
| 10,810,106 | B1 | * | 10/2020 | Amit ................... | G06F 11/3604 |

(Continued)

OTHER PUBLICATIONS

Bakhtouchi, Abdelghani, and Riadh Rahmouni. "A tree decision based approach for selecting software development methodology." 2018 International Conference on Smart Communications in Network Technologies (SaCoNeT). IEEE, 2018. (Year: 2018).*

*Primary Examiner* — Matthew J Brophy
(74) *Attorney, Agent, or Firm* — Mannava & Kang, P.C.

(57) ABSTRACT

An application development data processing system identifies one or more of a plurality of criteria associated with the development of a software application that do not meet standards and provides recommendations for improvement of the lagging criteria. Responses to questions about the plurality of criteria are clustered and queries are generated from a set of response clusters. The queries are executed to extract information from external data sources and a set of result clusters are generated from the extracted information. The maturity levels of the plurality of criteria for the software application development are determined based on a comparison of the maturity levels of the set of response clusters and the set of result clusters. Recommendations are output to improve the maturity levels of the lagging criterion.

20 Claims, 11 Drawing Sheets

(56) References Cited

U.S. PATENT DOCUMENTS

| 10,949,333 | B1 * | 3/2021 | Malde | G06F 8/71 |
|---|---|---|---|---|
| 11,915,106 | B2 * | 2/2024 | Arora | G06N 5/02 |
| 12,086,052 | B2 * | 9/2024 | Choudhury | G06F 11/3698 |
| 12,445,479 | B2 * | 10/2025 | Glas | H04L 63/1416 |
| 12,462,207 | B2 * | 11/2025 | Conde-Berrocal | G06F 21/57 |
| 12,487,901 | B1 * | 12/2025 | Jain | G06F 11/3438 |
| 2004/0015377 | A1 * | 1/2004 | Hostetler | G06F 11/3616 |
| | | | | 714/E11.22 |
| 2004/0093584 | A1 * | 5/2004 | Le | G06F 9/50 |
| | | | | 717/110 |
| 2006/0235732 | A1 * | 10/2006 | Miller | G06Q 10/06313 |
| | | | | 705/7.23 |
| 2007/0027810 | A1 * | 2/2007 | Longnecker | G06Q 10/10 |
| | | | | 705/51 |
| 2008/0115110 | A1 * | 5/2008 | Fliek | G06F 11/3672 |
| | | | | 714/38.14 |
| 2009/0106080 | A1 * | 4/2009 | Carrier | G06Q 30/0203 |
| | | | | 235/376 |
| 2011/0112876 | A1 * | 5/2011 | Khare | G06Q 10/063 |
| | | | | 705/7.11 |
| 2011/0295643 | A1 * | 12/2011 | Miller | G06Q 10/063 |
| | | | | 705/7.23 |
| 2014/0122182 | A1 * | 5/2014 | Cherusseri | G06Q 10/06 |
| | | | | 705/7.32 |
| 2014/0201714 | A1 * | 7/2014 | Vaidyan | G06F 11/3466 |
| | | | | 717/124 |
| 2022/0012627 | A1 * | 1/2022 | Arora | G06F 9/4856 |
| 2022/0292420 | A1 * | 9/2022 | Eberlein | G06Q 10/06313 |
| 2024/0275809 | A1 * | 8/2024 | Glas | G06N 20/00 |

* cited by examiner

450

Questionnaire Parameters*

| Category | Sub Category |
|---|---|
| AUTOMATION DISCIPLINES | AUTOMATION SCOPE |
| | AUTOMATION COVERAGE ACROSS APP STACK |
| | SDLC INTEGRATION |
| | AUTOMATED TEST EXECUTION |
| | ROI AND PRIORITIZATON |
| | AUTOMATION DEVELOPMENT PROCESS |
| HOLISTIC TESTING STRATEGY | TEST STRATEGY, PLANNING AND OPTIMIZATION |
| | BUSINESS PROCESS FOCUS |
| TEST DATA MANAGEMENT | TEST DATA PROVISIONING AND REFRESH |
| TEST ENVIRON MANAGEMENT | INFRASTRUCTURE SUITABILITY |
| | ENVIRONMENT ALLOCATION AND PROVISIONING |
| SERVICE VIRTUALISATION | VIRTUAL SERVICE USAGE |
| TEST MANAGEMENT | TEST ARTEFACT AND DEFECT MANAGEMENT |
| | KNOWLEDGE MANAGEMENT AND COLLABORATION |
| | METRICS, REPORTING AND ANALYTICS |
| DEVOPS MATURITY | DEVOPS READINESS |

460

| PARAMETER | GRADE |
|---|---|
| Ad-hoc | 1 |
| Repeatable | 2 |
| Consistent | 3 |
| Optimized | 4 |
| Leading | 5 |

OBTAIN MATURITY LEVELS FOR
THE RESPONSE CLUSTERS
702

OBTAIN MATURITY LEVELS FOR
THE RESULTS CLUSTERS
704

COMPARE THE MATURITY
LEVELS OF DIFFERENT
CLUSTERS PERTAINING TO AN
ASPECT OF APPLICATION
DEVELOPMENT
706

IDENTIFY RESPONSE CLUSTERS
WITH LOWER MATURITY LEVELS
AS GAPS
708

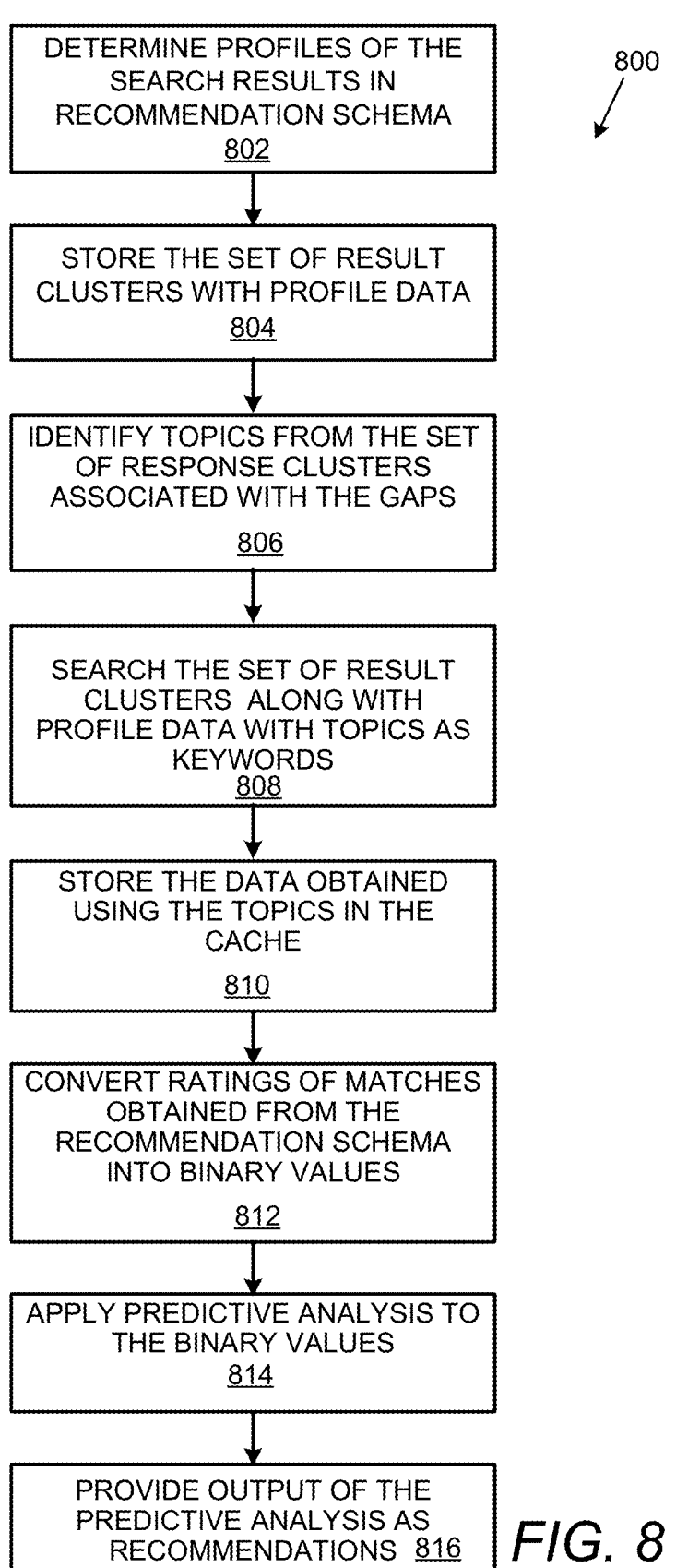

DETERMINE PROFILES OF THE
SEARCH RESULTS IN
RECOMMENDATION SCHEMA
802

STORE THE SET OF RESULT
CLUSTERS WITH PROFILE DATA
804

IDENTIFY TOPICS FROM THE SET
OF RESPONSE CLUSTERS
ASSOCIATED WITH THE GAPS
806

SEARCH THE SET OF RESULT
CLUSTERS  ALONG WITH
PROFILE DATA WITH TOPICS AS
KEYWORDS
808

STORE THE DATA OBTAINED
USING THE TOPICS IN THE
CACHE
810

CONVERT RATINGS OF MATCHES
OBTAINED FROM THE
RECOMMENDATION SCHEMA
INTO BINARY VALUES
812

APPLY PREDICTIVE ANALYSIS TO
THE BINARY VALUES
814

PROVIDE OUTPUT OF THE
PREDICTIVE ANALYSIS AS
RECOMMENDATIONS 816

APPLICATION MATURITY DATA PROCESSING FOR SOFTWARE DEVELOPMENT

BACKGROUND

The usage of computers in various establishments to carry out different tasks is a very well-established practice. This requires the implementation of software solutions that meet the needs of the organization. As the needs of different organizations are varied, the software developed should be flexible, scalable, and easy to use and maintain. Software Development Life Cycle (SDLC) is the process of defining goals and stages in building a software application. This process is important as the application developer lays out the main tasks to be carried out by the software application and structures them into a logical sequence.

BRIEF DESCRIPTION OF DRAWINGS

Features of the present disclosure are illustrated by way of examples shown in the following figures. In the following figures, like numerals indicate like elements, in which:

FIG. 4B shows the parameters of a questionnaire and decision tree parameters in accordance with the examples disclosed herein.

FIG. 8 shows a flowchart of a method of generating the recommendations in accordance with the examples disclosed herein.

DETAILED DESCRIPTION

Figure 1:
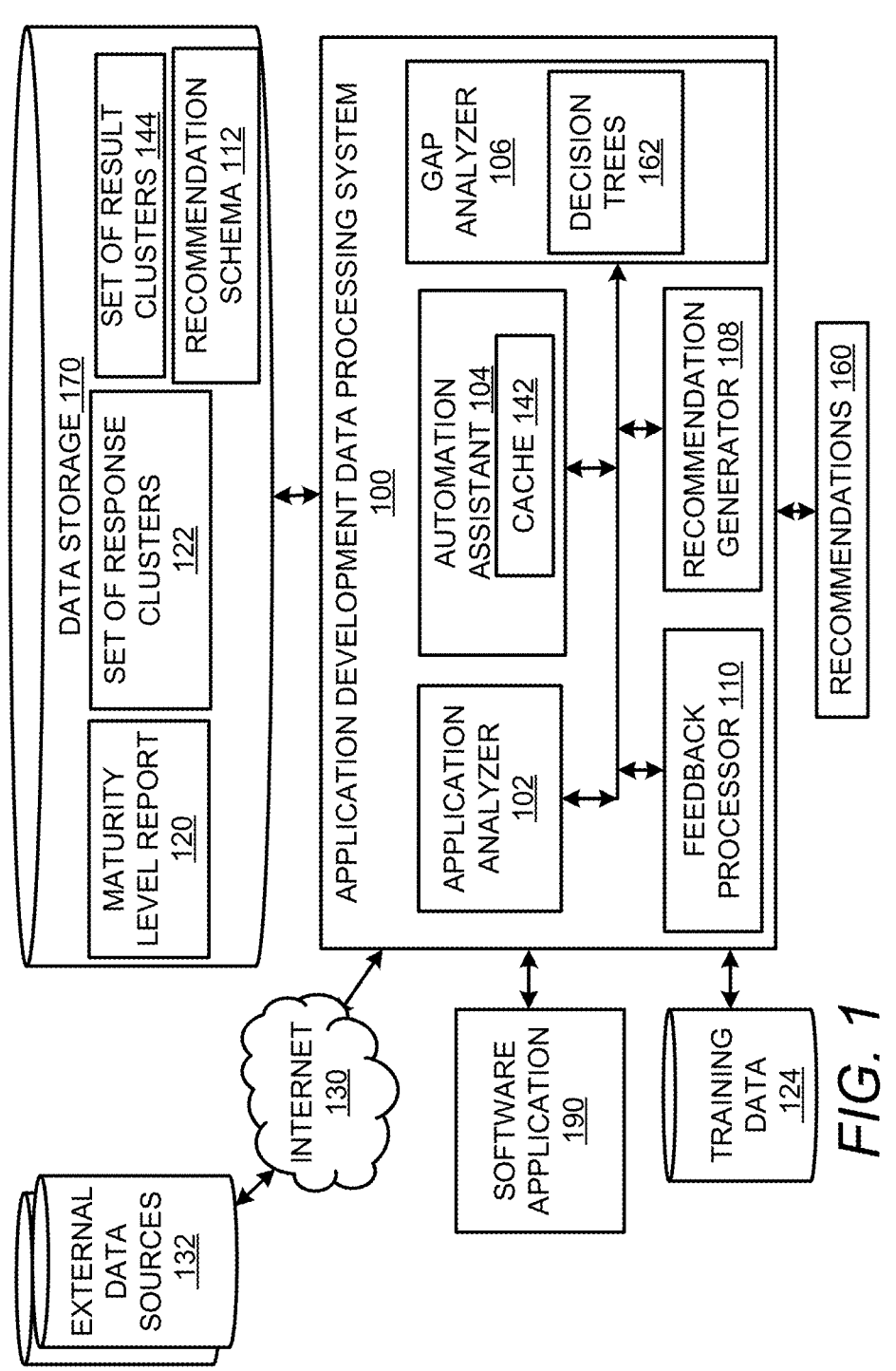
FIG. 1 shows an application development data processing system in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

An application development data processing system provides recommendations on improving one or more of a plurality of criteria applied in the development of a software application when the criteria do not meet the industry standards. The plurality of criteria may not only include a plurality of development stages associated with the development of the software application but also include other parameters which may be divided into categories and subcategories. The current state of the software application development is estimated by providing questionnaires to users with questions regarding the various aspects of the development process. The answers or responses collected from the users are clustered based on the plurality of criteria to form a set of response clusters. In an example, the questions and responses are framed in natural language so that natural language processing (NLP) techniques can be employed for processing the data in the responses.

The data from the response clusters can be systematically organized and used to formulate queries to retrieve additional information regarding the industry standards about the plurality of criteria from the other external domains. The queries are executed on the corresponding public domains to retrieve search results including the information. In an example, the search results can be initially stored in a recommendation schema along with the profile data. The profile data can include the various user reviews, and user experiences that may be within the search results. The search results are also clustered to generate a set of result clusters. The set of result clusters includes information related to the latest industry standards that are to be applied to the plurality of criteria. Therefore, a comparison between the set of response clusters and the set of result clusters enables estimating the maturity of the plurality of criteria in the development of the software application.

The compliance of the software application development with the industry standards can be conveyed via corresponding maturity levels associated with each of the plurality of criteria. In an example, the maturity levels may include markers indicative of compliance of the software application development with the various industry standards. Decision trees are trained in determining the maturity levels of the various data clusters. In an example, the decision trees can be trained via supervised training on labeled data to determine the maturity levels of the sets of data clusters with respect to the plurality of criteria. Accordingly, the set of response clusters is analyzed by the trained decision trees to determine their current maturity levels for each of the plurality of criteria in the software application development process. Similarly, the set of result clusters can also be analyzed by the decision trees to determine the target maturity levels of the current industry standards to be met by each of the plurality of criteria. A comparison between the current maturity levels of the target maturity levels enables the identification of gaps in the maturity levels of one or more of the plurality of criteria.

On identifying the gaps in the maturity levels of a subset of the plurality of criteria, recommendations can be generated for actions to be implemented in the software application development process to close the gaps between the current maturity levels and the target maturity levels. The recommendations for closing the gaps can be obtained from the set of result clusters. Topics can be extracted from the set of response clusters associated with the criteria associated with the gaps. The topics thus extracted can be used as keywords to search the set of result in clusters along with the profile data to obtain information related to the gaps. In an example, the information obtained from the set of result clusters by the keywords along with the profile data can be stored to a cache memory. This technique reduces the volume of data on which predictive analysis must be performed. The predictive analysis based on precision and recall is applied to the information related to the gap to generate recommendations for actions or steps that can be implemented in the software application development process to improve the maturity levels of the lagging criteria so that they are brought up to the industry standards. On providing the recommendations, feedback can be sought from the users to determine the effectiveness of the recommendations in closing the gaps in the maturity levels. The feedback including the user sentiments and comments thus obtained can be incorporated as profile data associated with the corresponding search results. When the search results with the updated profile data are retrieved, the profile data enables improving the accuracy of the recommendations.

The application development data processing system described herein affords a technical solution to the technical problem of improving the quality of the software applications being developed. Technology including the tools and platforms used is critical to ensuring quality when developing a software application in compliance with industry standards and modern methodologies. However, determining if the various aspects of software development comply with the industry criteria requires domain experts to provide judgments based on their experience. This process of collecting domain expertise is time intensive and tends to restrict delivery quality. The application development data processing system provides an NLP-based recommendation engine that automatically identifies gaps accurately in the various aspects of software development including technology, delivery method, and quality across the different software development life cycle (SDLC) stages. The latest information is extracted from the public databases in real-time efficiently via the use of a cache to store the search results.

When applied to a test automation use case, the application development data processing system provides various advantages and efficiencies. It makes the process faster owing to not only the reliance on Artificial Intelligence based solutions for gap identification but also due to the use of multiple cache memories for data processing. Accurate and impactful recommendations are provided based on systemic data modelling and customizable input. The use of NLP chunking methodology for generating the set of response clusters may contribute to improving the quality of data set acquired during the machine learning by removing a significant amount of junk data thereby leading to faster processing of application data. The application development data processing system which is configured to identify the gaps in the development of a software application and extract information to close the gaps in real time thereby improves the speed and efficiency of software development machines.

FIG. 1 shows an application development data processing system 100 in accordance with the examples disclosed herein. The system 100 includes an application analyzer 102, an automation assistant 104, a gap analyzer 106, and a recommendation generator 108. The system 100 can be connected to a data storage 170 that stores the data necessary for various operations in processing the data related to the development of a software application 190. The system 100 is configured to determine the maturity levels of each of a plurality of criteria for the development of the software application 190 and whether the maturity level of each criterion is adequate per the industry standards. For one or more of the plurality of criteria having lower maturity levels, the system 100 is configured to identify information from the Internet 130 related to improving the maturity levels so that they meet the requisite maturity levels prescribed by the industry standards. Recommendations 160 for improving the lower maturity levels of one or more of the plurality of criteria are generated based on the extracted information. In different examples, the software application 190 can be developed on the same machine hosting the application development data processing system 100 or on a disparate computing system remote from the system 100.

The application analyzer 102 is configured to analyze the plurality of criteria for the software application 190 by receiving and analyzing user responses to questions provided to them. In an example, the application analyzer 102 can provide questions related to the plurality of criteria. Responses from users to the questions are received by the application analyzer 102. The received responses are then clustered using Natural Language Processing (NLP) chunking techniques to generate a set of response clusters. Clustering methodologies such as but not limited to KMeans, Density-Based Spatial Clustering of Applications with Noise (DBSCAN), spectral clustering, hierarchical clustering, etc., can be used to generate a set of response clusters 122.

Based on the set of response clusters 122, the automation assistant 104 can be configured to trigger queries to public databases for extraction of information for filling the gaps identified in the corresponding criteria. The queries can be executed against public/external data sources 132 such as but not limited to, ChatGPT®, Stack Overflow®, Github®, etc. via the internet 130. The search results are stored by the automation assistant 104 in a recommendation schema 112. The information from the external data sources 132 can also be clustered using techniques outlined above to generate a set of result clusters 144. Again, the set of result clusters 144 can be based on the plurality of criteria.

The gap analyzer 106 can access the set of response clusters 122 and the set of result clusters 144 to determine the corresponding maturity levels. In an example, the gap analyzer 106 can include decision trees 162 that are trained to determine current maturity levels of the plurality of criteria based on the user response data in the set of response clusters 122. The decision trees 162 may also determine the industry standards for the maturity levels of the plurality of criteria from the set of result clusters 144. The decision trees 162 can be trained via supervised training methodologies or explicitly labeled training data 124. The training data 124 can include historic data with the various responses that can be given to the questions put to the users so that each of the set of response clusters is labeled with an associated maturity level. Similarly, the decision trees 162 can be trained to identify maturity levels for the set of result clusters 144 based on associated profile data and temporal tags described herein. The maturity levels of the set of response clusters 122 and the set of result clusters 144 can be compared to generate a maturity level report 120. The subsets of the set of response clusters 122 pertaining to one or more of the plurality of criteria with lower maturity levels are identified as gaps in the corresponding development stages of the software application development.

The recommendation generator 108 may execute predictive analytics on the set of result clusters 144. Recommendation models are created at the various stages of the automatic life cycle. The recommendation generator 108 further uses NLP techniques to convert the data from the recommendation models into recommendations 160 in human-readable formats. The recommendations 160 can either be provided via a GUI or other output modes such as emails or other forms of alerts on various user devices. Users can review the recommendations 160 and implement them at the corresponding development stages for improving the maturity levels of such development stages.

The system 100 also includes a feedback processor 110 which collects feedback on the suggestions or recommendations 160 so that the user feedback can be incorporated in profiling the data extracted from the external data sources 132 to enable improving the recommendations made over time. In an example, the feedback processor 110 may subscribe to the external data sources 132 so that any updates can be detected and incorporated into the results. The updates thus collected from the external data sources 132 can also be stored to the recommendation schema 112. In an example, wherein the software application 190 is still under development, such updates can be used to trigger the process of collecting the responses regarding the application data and determining if the plurality of criteria associated with the software development still meets the requisite maturity levels. If it is determined that any criteria have fallen below the industry standards as set out in the maturity levels, then suggestions or the recommendations 160 may be updated to improve the maturity levels of the lagging criteria. Thus, the system 100 can employ a cyclical process that automatically tracks the development of the application software and ensures that the industry standards are met.

Figure 2:
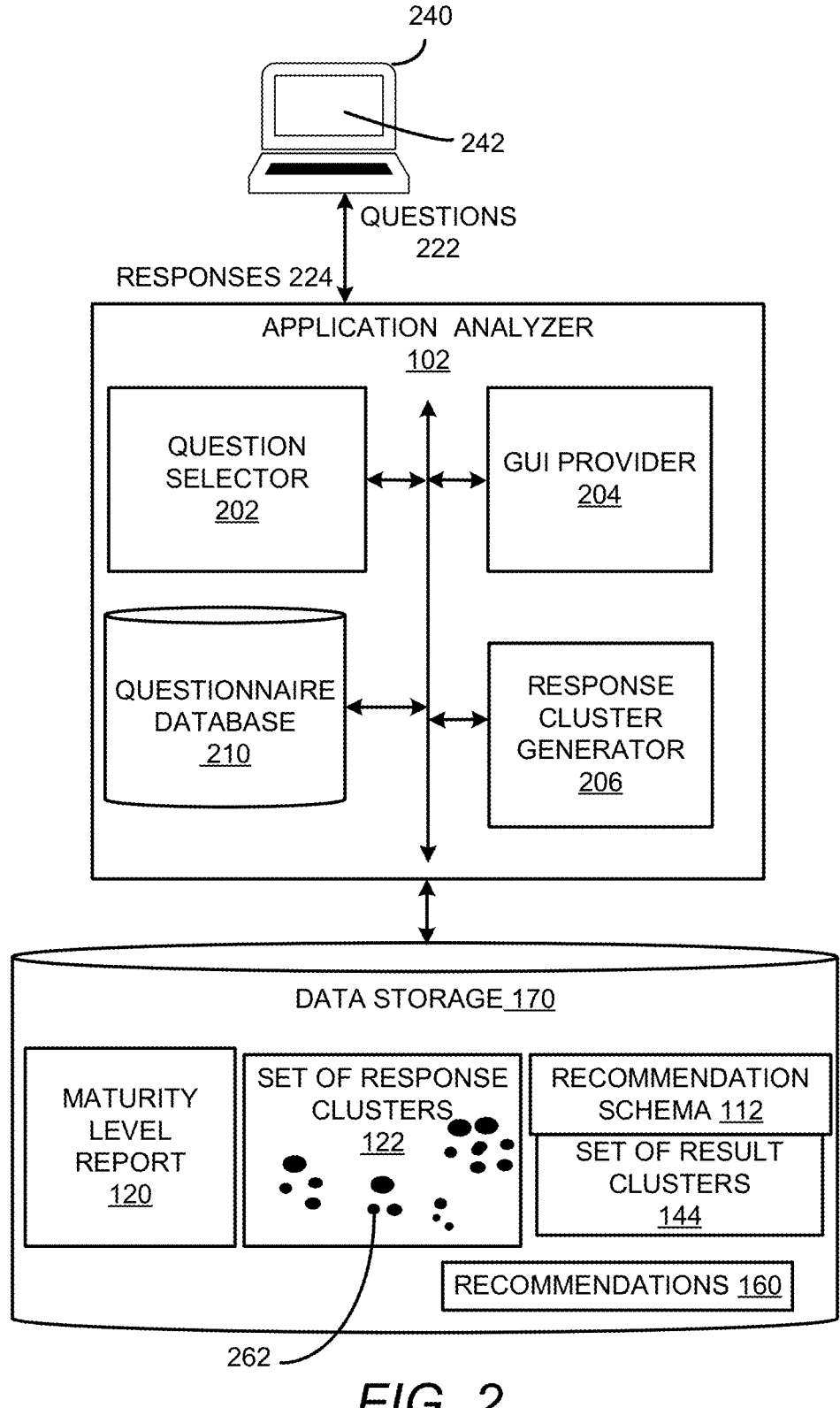
FIG. 2 shows a block diagram of an application analyzer in accordance with the examples disclosed herein.

FIG. 2 shows a block diagram of the application analyzer 102 in accordance with the examples disclosed herein. The application analyzer 102 is configured to analyze the plurality of criteria of the software application 190 to generate the set of response clusters 122. The application analyzer 102 can include a question selector 202, a questionnaire database 210, a graphical user interface (GUI) provider 204, and a response cluster generator 206. The question selector 202 can identify and transmit relevant questions 222 and receive the user's responses 224 of at least one user via a GUI 242 provided by the GUI provider 204 and displayed on a user device 240. The question selector 202 can be preconfigured to select specific questions/questionnaires regarding the development of the software application 190 based on different categories/sub-categories as outlined herein. The user responses 224 are provided to the response cluster generator 206 which can implement various NLP chunking methods detailed herein for generating response clusters 262 in the set of response clusters 122.

Figure 3:
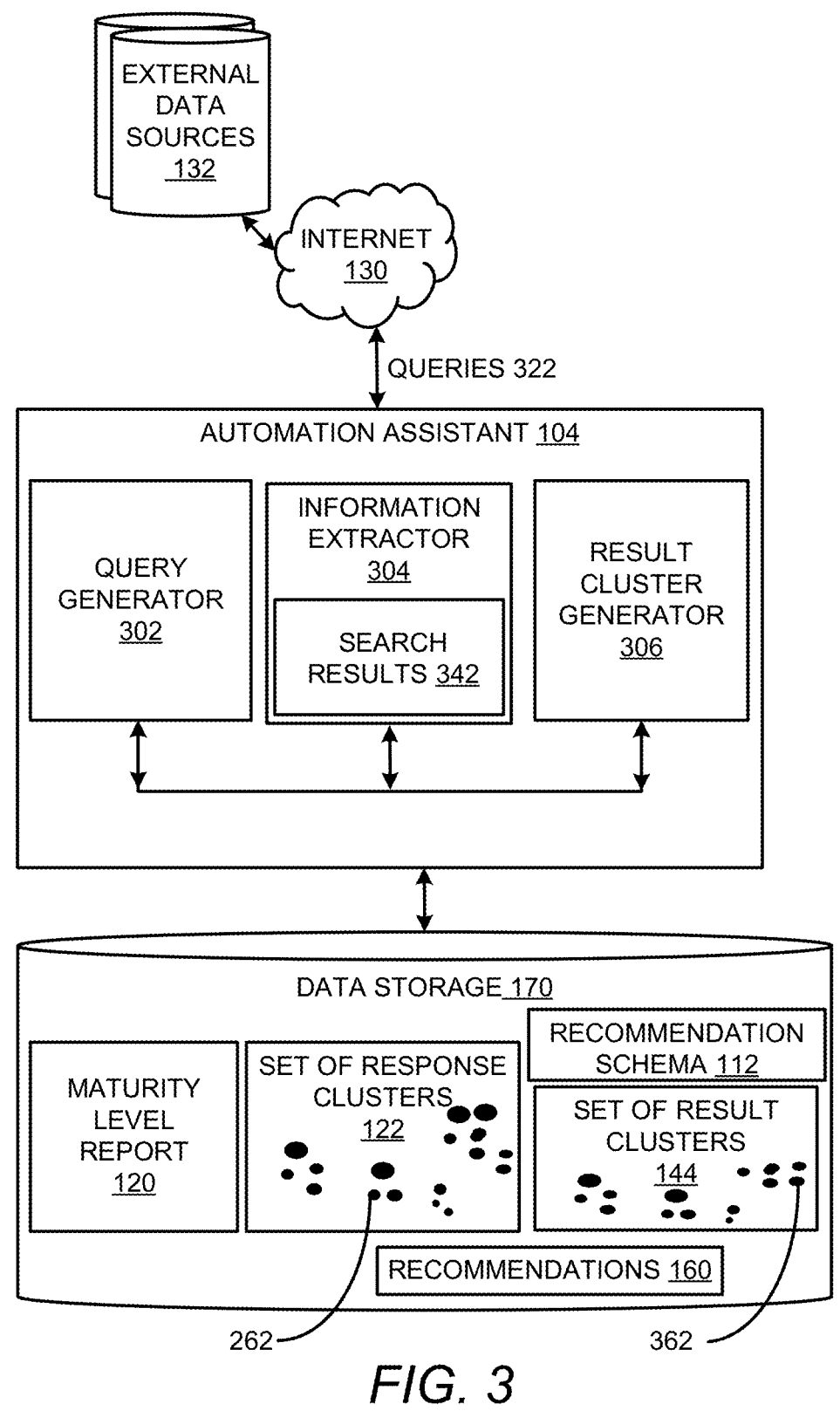
FIG. 3 shows a block diagram of an automation assistant in accordance with the examples disclosed herein.

FIG. 3 shows a block diagram of the automation assistant 104 in accordance with the examples disclosed herein. The automation assistant 104 includes query generator 302, an information extractor 304, and a result cluster generator 306. The query generator 302 accesses the set of response clusters 122 and is configured with predefined configuration options for implementing text processing techniques to extract data from the set of response clusters 122 in accordance with an assessment schema. Since the user responses 224 are clustered in the set of response clusters 122 based at least on the plurality of criteria, one or more queries 322 that are extracted from the set of response clusters 122 may also pertain to the plurality of criteria. The extracted queries 322 can be framed as disjoint keywords, short phrases of multiple keywords, or even complete sentences in natural language.

The queries 322 thus generated are used by the information extractor 304 to run searches of the external data sources 132 via the internet 130 or other communication networks to extract search results 342. In an example, the search results 342 are stored in a cache for temporary storage and quick retrieval. Although when a search related to the development of the software application 190 is executed for the first time a large quantum of data may be retrieved and stored in permanent data storage e.g., the data storage 170 within the recommendation schema 112 or even remote data storage, subsequent searches by the information extractor 304 only collect the delta which is any updates to the data already stored. As such updates are very sparse compared to the original search, the updated data in the subsequent searches can be stored in a cache for quicker retrieval thereby making the system 100 faster. The result cluster generator 306 clusters the search results 342 to generate search result clusters 362 using at least one of the different NLP chunking methodologies outlined above.

Figure 4A:
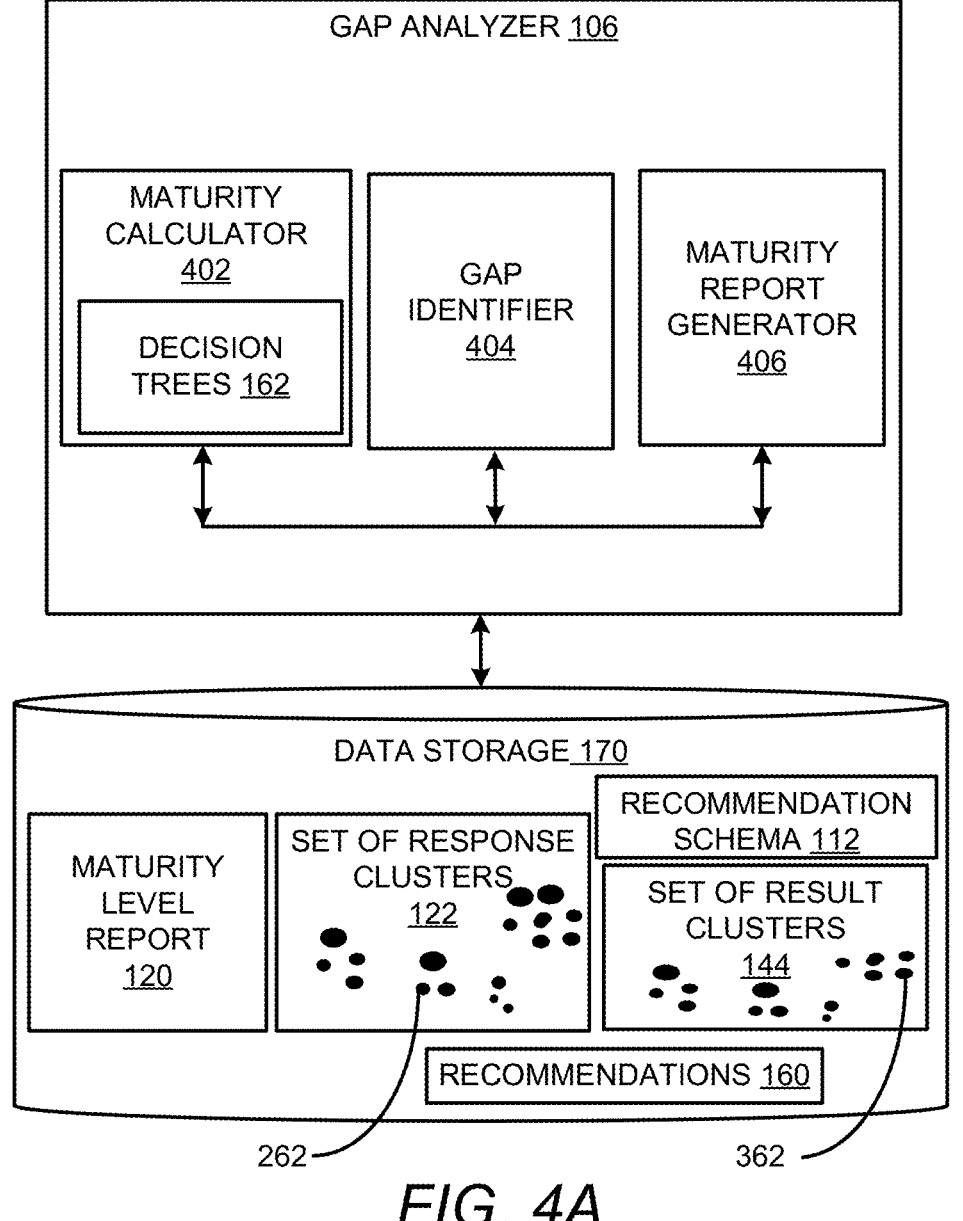
FIG. 4A shows a block diagram of a gap analyzer in accordance with the examples disclosed herein.

FIG. 4A shows a block diagram of the gap analyzer 106 in accordance with the examples disclosed herein. The gap analyzer 106 includes a maturity calculator 402, a gap identifier 404, and a maturity report generator 406. The maturity calculator 402 includes the decision trees 162 that are trained to calculate maturity levels of the various clusters including the set of response clusters 122 and the set of result clusters 144. As mentioned above, both the response clusters 262 and the result clusters 362 cluster the responses and results respectively based on the plurality of criteria. The maturity levels of the various response clusters 262 and the result clusters 362 are obtained by the maturity calculator using the decision trees 162. As mentioned above, the decision trees 162 are trained to identify the maturity levels of the various responses and the results in each of the response clusters 262 and the result clusters 362. In an example, a non-numerical maturity level from a plurality of maturity levels or a numerical maturity score from a plurality of maturity scores may be selected by the decision tree classifiers. The maturity levels of the members of a given cluster can be aggregated statistically to determine the maturity level of that cluster. The maturity levels of the response clusters 262 are indicative of the current maturity levels of the plurality of criteria of the software application 190. The maturity levels of the result clusters 362 are indicative of the current industry standards for the same plurality of criteria of the software application 190. The maturity levels of the set of response clusters 122 associated with a particular criterion of the plurality of criteria are compared with the maturity levels of the result clusters 362 associated with the same criterion by the gap identifier 404. A subset of the response clusters 262 having lower maturity levels than the result clusters 362 are identified as having gaps in maturity levels. The maturity report generator 406 produces a maturity report showing the gaps in the maturity levels if any in the plurality of criteria.

FIG. 4B shows the questionnaire parameters 450 and the decision tree parameters 460 in accordance with the examples disclosed herein. Turning now to FIG. 4B, each of the responses 224 can be graded on different questionnaire parameters 450 and assigned one of the maturity levels from the decision tree parameters 460. In the illustrated example, the grades are shown from the lowest grade to the highest grade wherein the highest grade is indicative of maturity in line with the industry standards and decreasing grades are indicative of lesser compliance with the industry standards. It may be appreciated that the questionnaire parameters and the decision tree parameters 460 are provided herein for illustration purposes only and that other parameters can be contemplated in accordance with other examples.

Figure 5:
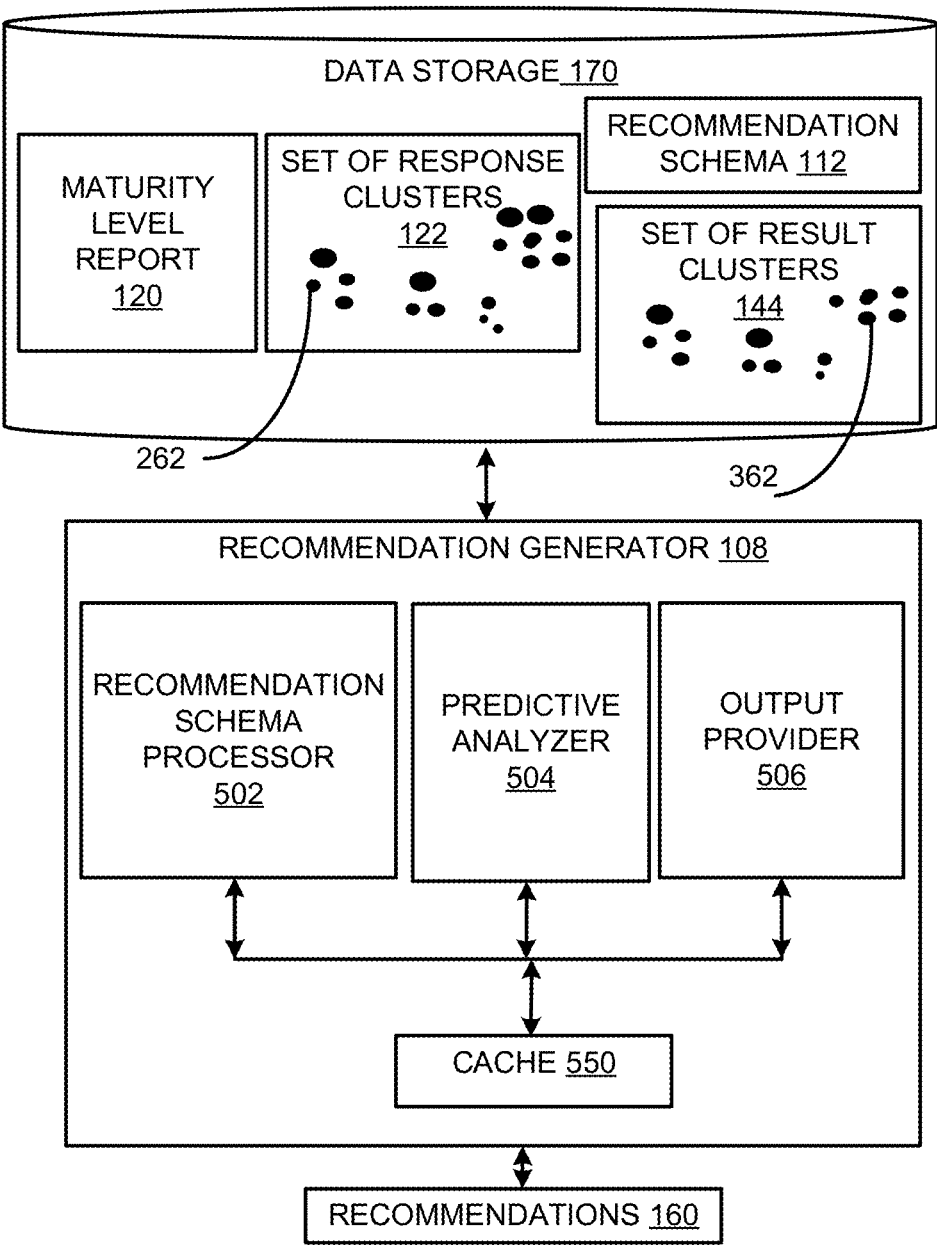
FIG. 5 shows a block diagram of a recommendation generator in accordance with the examples disclosed herein.

FIG. 5 shows a block diagram of the recommendation generator 108 in accordance with the examples disclosed herein. The recommendation generator 108 includes a recommendation schema processor 502, a predictive analyzer 504, and an output provider 506. In an example, the data from the set of result clusters 144 may be saved by the recommendation schema processor 502 to the recommendation schema 112. The data can also be profiled when saved. The profiling may be based on user feedback such as user reviews, user experiences, and the effectiveness of the solutions retrieved from the internet 130 which were previously implemented. In an example, the recommendation generator 108 may also include a cache 550 to store all results obtained from the recommendation schema 112 by using topics related to the gaps as queries on the search results 342. The cache 550 can be a hardware or a software component for temporary storage and fast retrieval of data. The predictive analyzer 504 executes predictive analysis on the data stored in the cache 550 to determine the improvements or changes that can be implemented for a given criterion e.g., at the particular development stage to raise the maturity levels to industry standards. The predictive analyzer 504 may further convert all the ratings/rankings associated with each of the result clusters 144 to binary values. In an example, a configurable benchmark may be set (e.g., a minimum rating of 3 out of 5) for the binary conversion so that only ratings/rankings meeting the benchmark are deemed relevant and converted whereas those that do not meet the benchmark are deemed irrelevant and disregarded. In an example, the predictive analysis can utilize the precision and recall method. The binary output from the predictive analyzer 504 is used by the output provider 506 to generate the recommendations 160 which may be output via modalities such as GUIs, messages (e.g., small message service (SMS) messages), emails, or messages for social media platforms to be provided to the users registered with the system 100 to receive the recommendations 160.

Figure 6:
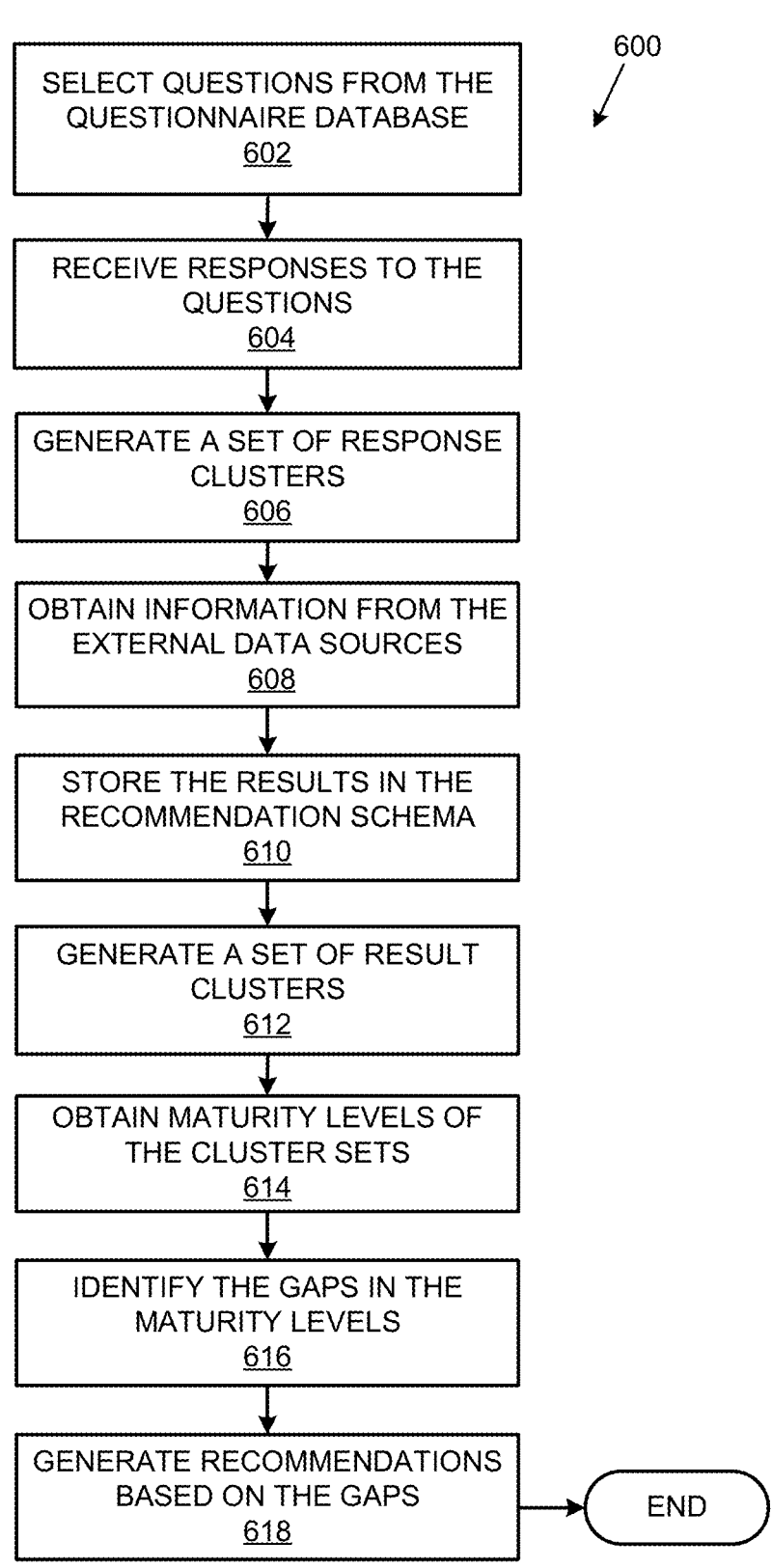
FIG. 6 shows a flowchart of a method of automating application development in accordance with the examples disclosed herein.

FIG. 6 shows a flowchart 600 of a method of automating application development in accordance with the examples disclosed herein. The method starts at 602 wherein questions 222 selected from the questionnaire database 210 are provided to users to assess the current state of the plurality of criteria of the software application 190. The responses 224 conveying the current state of the plurality of criteria are received at 604 from the users. The set of response clusters 122 are generated at 606 using the various NLP chunking techniques. The response clusters 262 cluster the responses 224 based on the plurality of criteria applied to the development process of the software application 190. Based on the responses 224 received from the users, information regarding the plurality of criteria is obtained from the external data sources 132 using the Internet 130 at 608. In an example, the Application Programming Interfaces (APIs) such as openAI Node.js libraries, api.stockexchange.com, api.github.com, etc., can be provided with keywords from the response clusters 262 to execute the searches.

In an example, the information or the search results 342 obtained at 608 may be stored in the recommendation schema 112 at 610. At 612, the search results 342 are clustered to generate the set of result clusters 144. At 614, the maturity levels of the set of response clusters 122 and the set of result clusters 144 are obtained using trained decision trees 162. The maturity levels of the set of response clusters 122 indicate the current maturity of each of the plurality of criteria of the software application development process. The maturity levels of the set of result clusters 144 indicate the target maturity levels the plurality of criteria should take per the industry standards. At 616, the gaps in the current maturity levels in comparison with the target maturity levels of one or more criteria of the plurality of criteria are identified. In an example, the identification of gaps can include extraction and storage of textual data such as keywords, phrases, or sentences from the response clusters 262 associated with the gaps or the development stages with lower maturity levels. At 618, recommendations for improving the lower maturity levels of the plurality of criteria are generated based on the textual data associated with the gaps.

For example, if a gap pertaining to the inability to roll out frequent builds on digital web features is identified in one of the development stages, the system 100 can provide the below sample recommendations to compensate for this gap:

Recommendations Sample based on ranking derived from the predictive analysis:

Adopt Agile methodologies: Agile methodologies emphasize iterative development, continuous delivery, and rapid feedback. By adopting Agile methodologies, teams can break down large projects into smaller, manageable pieces, and release working software to the market more frequently.

Implement continuous integration and deployment: Continuous integration and deployment (CI/CD) automate the build, testing, and deployment process, enabling teams to release new features quickly and with minimal risk. CI/CD also helps to catch bugs and issues early in the development process, reducing the risk of introducing errors into production.

Emphasize quality assurance: Quality assurance is critical to ensuring that releases are stable and meet customer expectations. To enable frequent releases to the market, teams should prioritize quality assurance activities, including testing, code reviews, and documentation.

Foster a culture of experimentation: Experimentation is key to innovation and continuous improvement. To enable frequent releases to market, teams should foster a culture of experimentation, encouraging team members to try new approaches and learn from their mistakes.

Collaborate across teams: Collaboration is essential to achieving frequent releases to market. Teams should collaborate across departments, including development, quality assurance, and operations, to ensure that releases are well-coordinated and aligned with business objectives.

Prioritize customer feedback: Customer feedback is critical to improving digital products and ensuring that they meet customer needs. To enable frequent releases to the market, teams should prioritize customer feedback and use it to inform development priorities and product roadmaps.

Streamline the release process: To enable frequent releases to market, teams should streamline the release process, eliminating bottlenecks and reducing the time required to release new features. This might involve automating the release process, simplifying release documentation, and reducing the number of required approvals.

Figure 7:
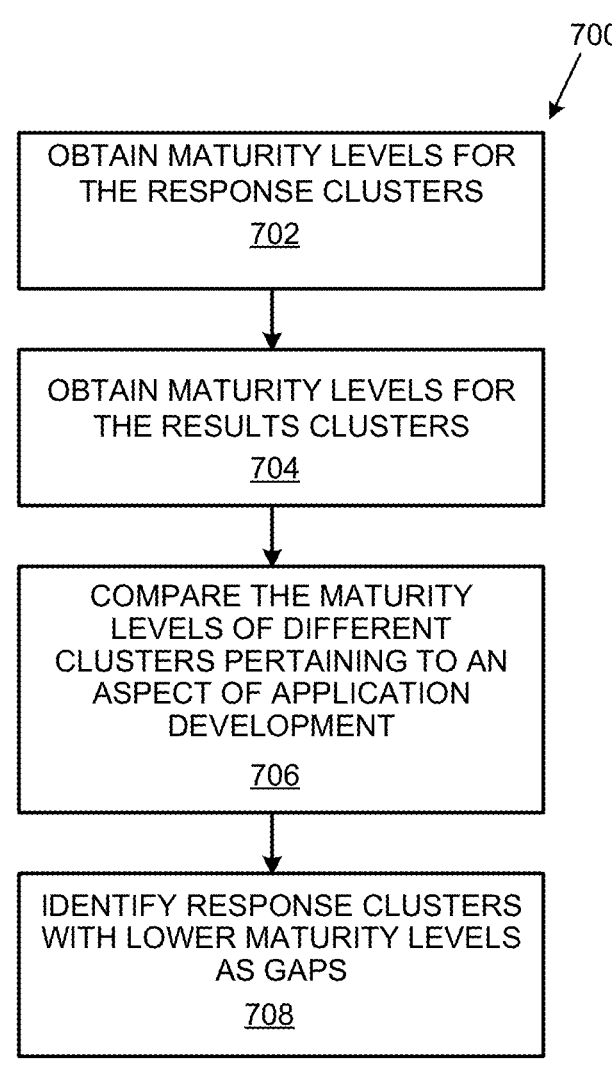
FIG. 7 shows a flowchart that details a method of identifying the gaps in the maturity levels in accordance with the examples disclosed herein.

FIG. 7 shows a flowchart 700 that details a method of identifying the gaps in the maturity levels by the gap analyzer 106 in accordance with the examples disclosed herein. At 702, the maturity levels are obtained for the set of response clusters 122 wherein the responses are clustered based on the corresponding development stage associated with each of the responses. The set of response clusters 122 can be generated based on predefined configuration options which may include the plurality of criteria of the software application. The different criteria may have sub-categories associated therewith and the maturity levels are obtained by the decision trees 162 for the various aspects including the sub-categories. Similarly, at 704, the maturity levels of the result clusters 362 are obtained. At 706, the maturity levels of the response clusters 262 for a given category/sub-category or development stage can be compared with those of the corresponding result clusters 362. At 708 the response clusters 262 having lower maturity levels than the result clusters 362 corresponding to the same category or criterion are identified as gaps to be remedied.

FIG. 8 shows a flowchart 800 of a method of generating the recommendations 160 in accordance with the examples disclosed herein. At 802, the search results 342 or the set of result clusters 144 generated from the search results 342 can be profiled based on the user reviews, and user experiences related to the technical content of the search results such as the effectiveness of the solutions retrieved from the external data sources 132. In an example, NLP techniques including sentiment analysis can be applied at 802 to determine the profiles of the various search results 342, and the search results 342 may be further tagged with the profile data. The contents of the set of results clusters 144 thus processed with profile data can be stored in the recommendation schema 112 at 804. For example, a webpage with a suggestion may be processed using text processing techniques for data extraction and sentiment analysis. The webpage can be tagged with the output of the sentiment analysis per the recommendation schema 112. At 806, textual data from the set of response clusters 122 associated with the gaps i.e., with lower maturity levels is analyzed for related topic identification. At 808, the related topics that are identified can be used as keywords to search for data from the set of result clusters 144 stored in the recommendation schema 112. The data obtained from the recommendation schema 112 using the topics is stored in the cache 550 at 810. The ratings of the matches obtained at 810 which exceed the configurable benchmark can be converted to binary values at 812 and further subjected to predictive analysis based, for example, on precision and recall methods at 814. The output of the predictive analysis can be provided as the recommendations at 816.

Figure 9:
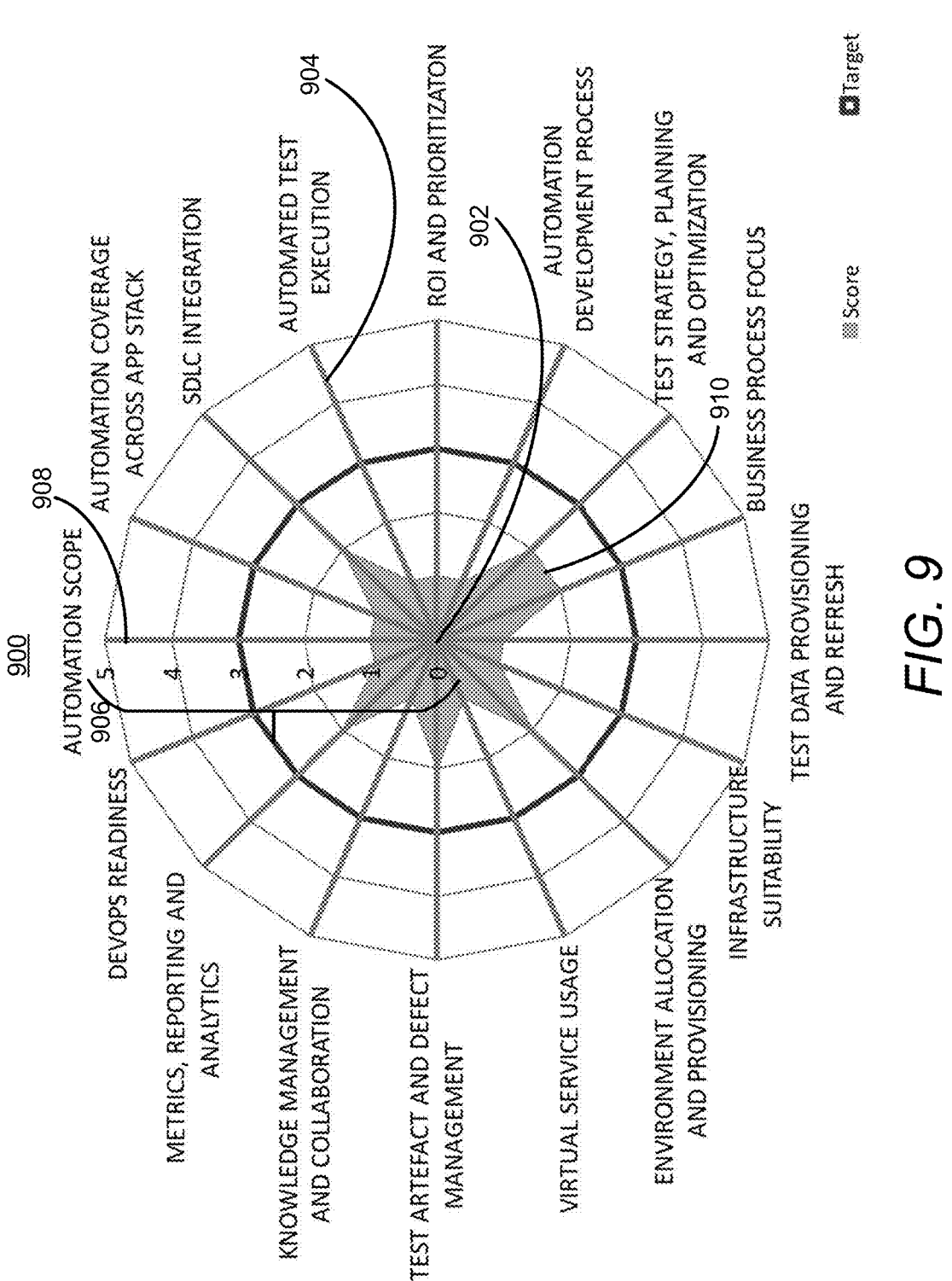
FIG. 9 shows a diagram of an example maturity level report generated in accordance with the examples disclosed herein.

FIG. 9 shows a diagram of an example maturity level report 120 generated in accordance with the examples disclosed herein. As mentioned herein, the maturity level report 120 shows the gaps in the maturity levels between the set of response clusters 122 and the set of result clusters 144 for various categories or criteria which may include the plurality of criteria. In the maturity level report, 120 different variables are shown in the form of a radar graph 900 with the various criteria or categories marked on the axes starting from center 902. For example, the criterion of automated text execution is marked out on the axis 904. The maturity levels 906 are marked out on the axis 908. In this particular example, the maturity level 3 is considered the target maturity level. The irregular polygon 910 shows the actual/current maturity levels of the response clusters 262 with respect to the various criteria.

Figure 10:
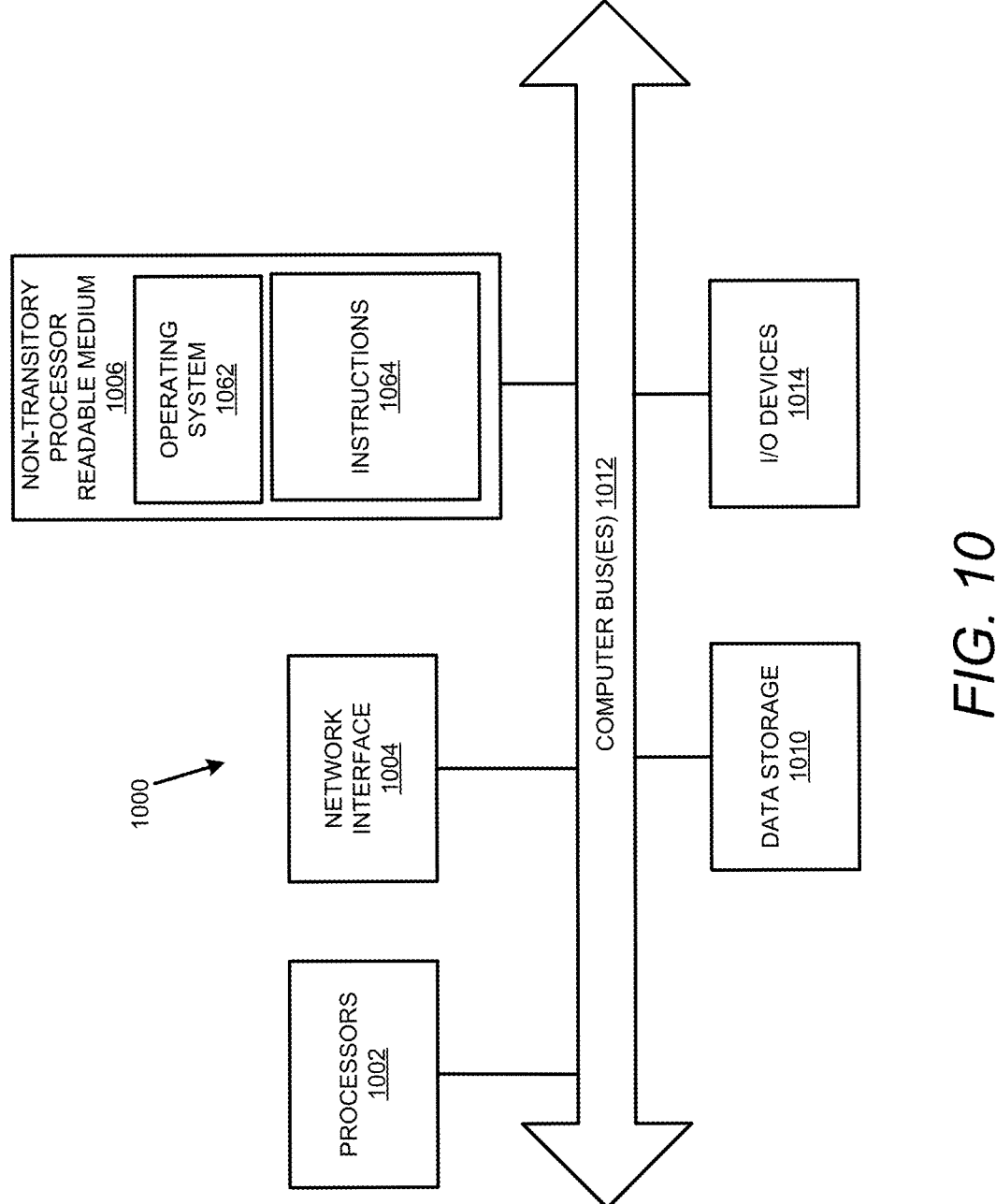
FIG. 10 illustrates a computer system that may be used to implement the application development data processing system in accordance with the examples disclosed herein.

FIG. 10 illustrates a computer system 1000 that may be used to implement the application development data processing system 100 in accordance with the examples disclosed herein. More particularly, computing machines such as desktops, laptops, smartphones, tablets, and wearables which may be used to generate or access the data from the data processing system 100 may have the structure of the computer system 1000. The computer system 1000 may include additional components not shown and some of the process components described may be removed and/or modified. In another example, a computer system 1000 can sit on external-cloud platforms such as Amazon Web Services, AZURE® cloud or internal corporate cloud computing clusters, or organizational computing resources, etc.

The computer system 1000 includes processor(s) 1002, such as a central processing unit, ASIC or another type of processing circuit, input/output (I/O) devices 1014, such as a display, mouse keyboard, etc., a network interface 1004, such as a Local Area Network (LAN), a wireless 802.11x LAN, a 3G, 4G or 5G mobile WAN or a WiMax WAN, and a computer-readable or processor-readable medium 1006. Each of these components may be operatively coupled to a bus 1012. The processor-readable medium 1006 may be any suitable medium that participates in providing instructions to the processor(s) 1002 for execution. For example, the processor-readable medium 1006 may be a non-transitory or non-volatile storage medium, such as a magnetic disk or solid-state non-volatile memory, or a volatile medium such as RAM. The instructions or modules stored on the processor-readable medium 1006 may include machine-readable instructions 1064 executed by the processor(s) 1002 that cause the processor(s) 1002 to perform the methods and functions of the data processing system 100.

The data processing system 100 may be implemented as software or machine-readable instructions stored on a non-transitory processor-readable storage medium and executed by one or more processors 1002. For example, the computer-readable storage medium or non-transitory processor-readable medium 1006 may store an operating system 1062, such as MAC OS, MS WINDOWS, UNIX, or LINUX, and code/instructions 1064 for the data processing system 100. The operating system 1062 may be multi-user, multiprocessing, multitasking, multithreading, real-time, and the like. For example, during runtime, the operating system 1062 is running and the code for the data processing system 100 is executed by the processor(s) 1002.

The computer system 1000 may include a data storage 1010, which may include non-volatile data storage. The data storage 1010 may be used as a local data storage e.g., the data storage 170 that stores data such as the set of response clusters 122, the set of result clusters 144, the maturity level report 120, generated and/or used by the data processing system 100 during its operation.

The network interface 1004 connects the computer system 1000 to internal systems for example, via a LAN. Also, the network interface 1004 may connect the computer system 1000 to the Internet. For example, the computer system 1000 may connect to web browsers and other external applications and systems via the network interface 1004.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

What is claimed is:

1. An application data processing system, comprising:
   at least one processor;
   a non-transitory, processor-readable medium storing machine-readable instructions that cause the at least one processor to:
   receive responses from users for questions regarding a plurality of criteria applied in development of a software application;
   generate a set of response clusters from the responses, wherein the response clusters cluster the responses based on a corresponding criterion of the plurality of criteria;

extract information including search results from one or more external data sources based on the set of response clusters and associated with the plurality of criteria;

generate a set of result clusters from the search results extracted from the one or more external data sources;

obtain, from a decision tree classifier, a maturity level associated with each of the set of response clusters and the set of result clusters with respect to the plurality of criteria;

identify one or more gaps in the maturity levels of one or more response clusters of the set of response clusters with respect to one or more criteria of the plurality of criteria, wherein the one or more gaps are identified based on lower maturity levels of the one or more criteria of the plurality of criteria; and automatically generate recommendations for improving the lower maturity levels of the one or more criteria with the lower maturity levels, wherein the recommendations are generated from the set of result clusters.

2. The application data processing system of claim 1, wherein to receive responses from the users for the questions the at least one processor executes instructions to:

access a questionnaire database; and provide a questionnaire including the questions, wherein the questions are from the questionnaire database, to the users via a graphical user interface (GUI).

3. The application data processing system of claim 1, wherein to obtain the maturity levels of the plurality of criteria, the at least one processor is to:

train the decision tree classifier via supervised techniques on labeled training data that includes historic data of the plurality of criteria associated with other prior applications and corresponding maturity levels.

4. The application data processing system of claim 1, wherein, the at least one processor is to further:

generate a maturity level report including a comparison of the maturity levels of the set of response clusters with the set of result clusters for each of the plurality of criteria.

5. The application data processing system of claim 1, wherein to identify the one or more gaps in the maturity levels, the at least one processor is to:

compare the maturity levels of the set or response clusters for each of the plurality of criteria with corresponding maturity levels of the set of result clusters for the plurality of criteria.

6. The application data processing system of claim 1, wherein the maturity levels include markers indicative of compliance of the development of the software application as indicated by the set of response clusters with industry standards as conveyed in the set of result clusters.

7. The application data processing system of claim 1, wherein to extract the information, the at least one processor is to:

automatically formulate queries from the set of response clusters associated with the gaps.

8. The application data processing system of claim 1, wherein to automatically generate recommendations, the at least one processor is to:

determine profiles of the search results in the set of result clusters, wherein the profiles of the search results include user sentiments and comments on technical content of the search results.

9. The application data processing system of claim 8, wherein to automatically generate recommendations, the at least one processor is to:

identify related topics from the one or more response clusters associated with the one or more gaps;

execute a search of the set of result clusters along with the profiles with the related topics as keywords;

cache data obtained using the keywords from the set of result clusters along with the profiles;

execute predictive analysis on the cached data, wherein the predictive analysis is based on precision and recall method.

10. The application data processing system of claim 9, wherein to automatically generate recommendations, the at least one processor is to:

provide an output of the predictive analysis as the recommendations for filling the one or more gaps.

11. A method of processing application data comprising:

receiving responses from users for questions regarding a plurality of criteria applied in development of a software application;

generating a set of response clusters from the responses, wherein the response clusters cluster the responses based on a corresponding one of the plurality of criteria;

extracting information extracted from one or more external data sources, wherein the information includes search results associated with the plurality of criteria;

generating a set of result clusters from the search results extracted from the one or more external data sources;

obtaining, from a decision tree classifier, a maturity level associated with each of the set of response clusters and the set of result clusters with respect to the plurality of criteria;

identifying one or more gaps in the maturity levels of one or more response clusters of the set of response clusters with respect to at least one criterion of the plurality of criteria, wherein the one or more gaps are identified based on lower maturity levels of the at least one criterion;

automatically generating recommendations for improving corresponding maturity levels of corresponding development stages with the lower maturity levels, wherein the recommendations are generated from the set of result clusters.

12. The method of claim 11, wherein receiving responses from the users for the questions further comprises:

accessing a questionnaire database; and providing a questionnaire from the questionnaire database to the users including the questions via a graphical user interface (GUI).

13. The method of claim 11, wherein obtaining the maturity levels further comprises:

training the decision tree classifier via supervised techniques on labeled training data that includes historic data of the plurality of criteria associated with other prior applications and corresponding maturity levels.

14. The method of claim 11, wherein identifying the one or more gaps in the maturity levels further comprises:

comparing the maturity levels of the set or response clusters for each of the plurality of criteria with corresponding the maturity levels of the set of result clusters for the plurality of criteria.

15. The method of claim 11, wherein extracting the information, further comprises:

automatically formulating queries from the set of response clusters associated with the gaps; and providing the queries to public Application Programming Interfaces (APIs) of the external data sources.

16. The method of claim 11, wherein automatically generating the recommendations, further comprises:

determining profiles of the search results in the set of result clusters, wherein the profiles of the search results include user sentiments and comments on technical content of the search results.

17. The method of claim 11, further comprising:

obtaining updates to the external data sources;

updating the set of result clusters based on the updates to the external data sources;

calculating the maturity levels of the set of updated result clusters; and providing updated recommendations based on a comparison of the maturity levels of the set of updated result clusters with the maturity levels of the set of response clusters.

18. A non-transitory processor-readable storage medium comprising machine-readable instructions that cause a processor to:

receive responses from users for questions regarding a plurality of criteria applied in development of a software application;

generate a set of response clusters from the responses, wherein the response clusters cluster the responses based on a corresponding one of the plurality of criteria;

extract information extracted from one or more external data sources as search results associated with the plurality of criteria;

generate a set of result clusters from the search results extracted from the one or more external data sources;

obtain, from a decision tree classifier, a maturity level associated with each of the set of response clusters and the set of result clusters with respect to the plurality of criteria;

identify one or more gaps in the maturity levels of one or more response clusters of the set of response clusters with respect to at least one criterion of the plurality of criteria, wherein the one or more gaps are identified based on lower maturity levels of the at least one criterion;

automatically generate recommendations for improving the lower maturity levels of the at least one criterion, wherein the recommendations are generated from one or more result clusters of the set of result clusters.

19. The non-transitory processor-readable storage medium of claim 18, wherein the instructions to automatically generate the recommendations further comprise instructions that cause the processor to:

convert rankings associated with the one or more result clusters over a configurable benchmark into binary values.

20. The non-transitory processor-readable storage medium of claim 19, further comprising instructions that cause the processor to:

identify the recommendations from the one or more result clusters by executing predictive analysis on the binary values.

* * * * *